March 10, 1931.   E. J. S. SWANSON   1,796,129
CONDUIT FITTING
Filed Aug. 7, 1926   2 Sheets-Sheet 1

Elmer J. S. Swanson
INVENTOR.

BY
ATTORNEYS.

March 10, 1931. E. J. S. SWANSON 1,796,129
CONDUIT FITTING
Filed Aug. 7, 1926 2 Sheets-Sheet 2

Elmer J. S. Swanson
INVENTOR.
BY
ATTORNEYS.

Patented Mar. 10, 1931

1,796,129

UNITED STATES PATENT OFFICE

ELMER J. S. SWANSON, OF ERIE, PENNSYLVANIA, ASSIGNOR TO ERIE MALLEABLE IRON COMPANY, OF ERIE, PENNSYLVANIA, A CORPORATION OF PENNSYLVANIA

CONDUIT FITTING

Application filed August 7, 1926. Serial No. 127,807.

In the use of conduit fittings it is frequently desirable to reduce the size of the opening of the fitting so as to connect it with a smaller conduit than the opening to the fitting. The present invention is designed to accomplish this purpose with relation to fittings designed for use with threadless conduits. Features and details of the invention will appear from the specification and claims.

The invention is illustrated in the accompanying drawings as follows:—

Figure 1:
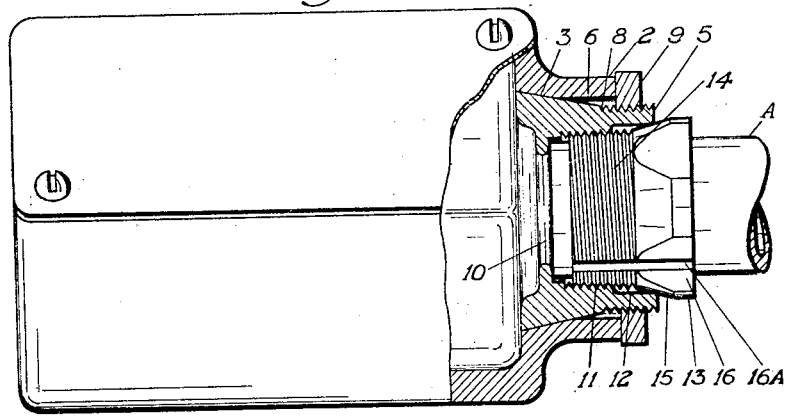
Figure 3:
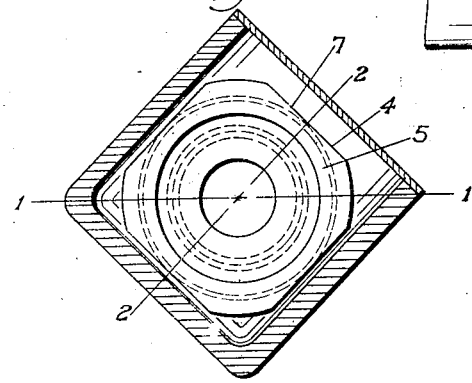

Fig. 1 shows an elevation, partly in section, on the line 1—1 in Fig. 3.

Figure 2:
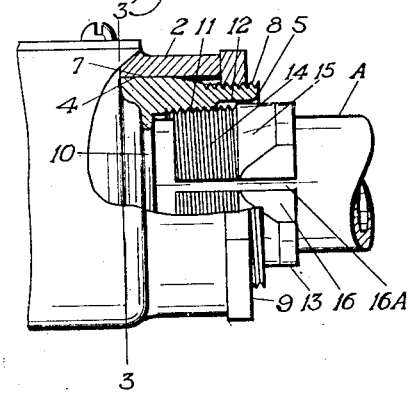

Fig. 2 an elevation of a conduit fitting, partly in section, on the line 2—2 in Fig. 3.

Fig. 3 a section on the line 3—3 in Fig. 2.

Figure 4:
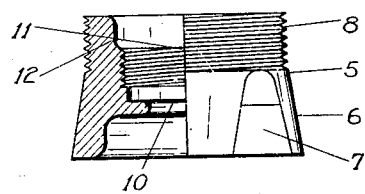

Fig. 4 an elevation, partly in section, of the reducing member.

Figure 5:
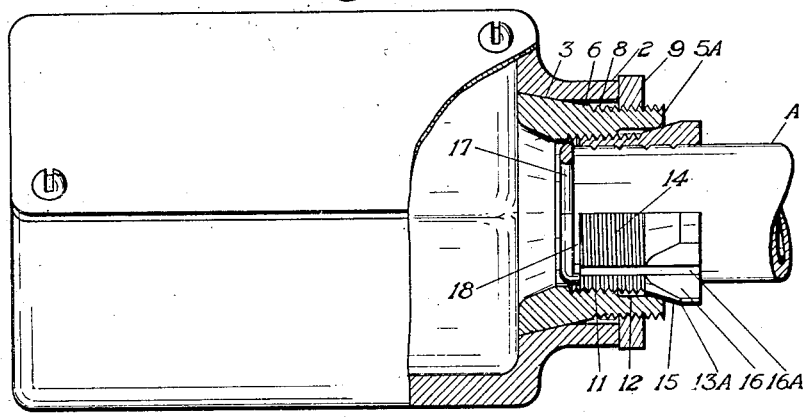
Figure 7:
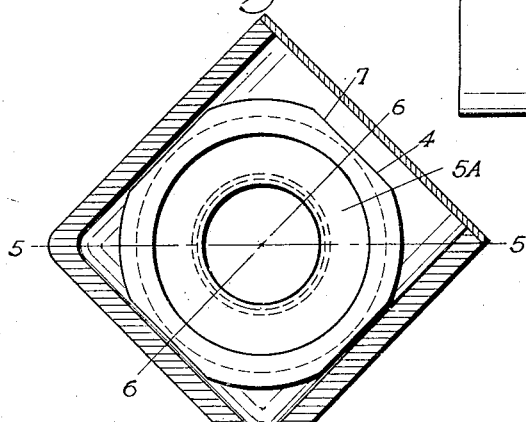

Fig. 5 an elevation of an alternative construction, partly in section, on the line 5—5 in Fig. 7.

Figure 6:
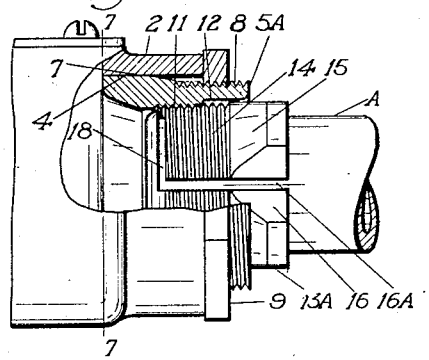

Fig. 6 an elevation of the same structure, partly in section, on the line 6—6 in Fig. 7.

Fig. 7 a section on the line 7—7 in Fig. 2.

Figure 8:
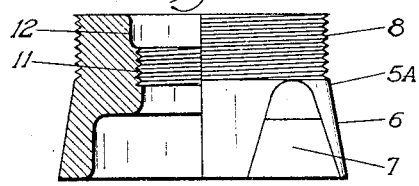

Fig. 8 a side elevation, partly in section, of the reducing member shown in Figs. 5, 6 and 7.

In all the constructions the conduit fitting is indicated in the form of a conduit box but it will be understood that the fitting is not limited to this particular type. The fitting has a conduit receiving extension 2 with a tapered surface 3 on its inner wall having flats or out of round portions 4 therein.

In the construction shown in Figs. 1 to 4 a reducing member 5 is arranged in the extension, this member having a tapered surface 6 in wedging engagement with the surface 3 and being provided with flats 7 adapted to engage flats 4 in the extension. The reducing member is externally screw-threaded at its outer end at 8 and a nut 9 is arranged on the screw thread 8 and adapted to draw the reducing member into the extension bringing the wedging surfaces into clamping engagement. The reducing member is provided with a guard lip 10 adapted to guard the end of an inserted conduit A. It is also provided with an internal screw thread 11 at its inner end and an annular wedging surface 12 at its outer end.

A contractible sleeve 13 is arranged in the reducing member, the sleeve having a screw threaded inner end 14, an unthreaded intermediate portion 15, and a wrench-hold portion 16 at its outer end. It is also provided with a slot 16a which renders it readily contractible. When the contracting sleeve is screwed into the reducing member the unthreaded portions of the reducing member and contractible sleeve are brought into wedging engagement forcing the contraction of the sleeve into clamping engagement with the inserted conduit.

It will be noted that the opening in the extension 2 is adapted to receive a threadless conduit securing means such as is shown in the application of Howard A. Selah, #743,629, filed Oct. 14th, 1924.

In the alternative construction shown in Figs. 5, 6 and 7, the reducing member 5a is similar to the reducing member 5 in every respect except that the guard lip is omitted. A contractible sleeve 13a is similar to the contractible sleeve 13 in every respect except that a guard lip 17 is arranged directly on the reducing sleeve 13a and a circumferential slit 18 extends from the slot 16a separating a part of the circumference of the sleeve from the lip and thus permitting the sleeve to readily contract.

What I claim as new is:—

1. In a conduit fitting, the combination of a body having an extension, said extension having a conduit receiving opening adapted to receive a threadless conduit securing means, said opening being larger at its inner end; a reducing member arranged in the opening and having its inner end the larger and adapted to contact with wedging engagement the wall of the body opening, said reducing member having an externally screw-threaded outer end and an internally screw-threaded inner end and an internally unthreaded annular outer end; a nut on the reducing member; and a contractible sleeve in the reducing member having a screw-threaded inner end, an unthreaded intermediate portion, and a wrench-hold portion at its outer end, said unthreaded portions having wedging surfaces in wedging engagement and said sleeve having a slot rendering the same contractible.

2. A conduit fitting in the form of a tube having an exterior wedging surface larger at its inner end and an exterior screw thread at its outer end and an interior screw thread with an interior wedging surface at its outer end.

In testimony whereof I have hereunto set my hand.

ELMER J. S. SWANSON.